United States Patent [19]

Chen et al.

[11] Patent Number: 5,838,995
[45] Date of Patent: Nov. 17, 1998

[54] SYSTEM AND METHOD FOR HIGH FREQUENCY OPERATION OF I/O BUS

[75] Inventors: Wen-Tzer Thomas Chen, Austin, Tex.; Richard Allen Kelley, Apex, N.C.; Danny Marvin Neal, Round Rock, Tex.

[73] Assignee: International Business Machines Corporation, Armonk, N.Y.

[21] Appl. No.: 573,682

[22] Filed: Dec. 18, 1995

[51] Int. Cl.⁶ .................................................. G06F 13/42
[52] U.S. Cl. .................... 395/880; 395/200.63; 395/556; 395/550
[58] Field of Search .................. 395/550, 556, 395/280, 880, 205.63, 886, 858, 800, 88; 327/142

[56] References Cited

U.S. PATENT DOCUMENTS

| | | | |
|---|---|---|---|
| 4,095,267 | 6/1978 | Morimoto | 395/556 |
| 4,344,132 | 8/1982 | Dixon et al. | 395/250 |
| 4,872,107 | 10/1989 | Marple et al. | 395/556 |
| 5,163,146 | 11/1992 | Antanaitis, Jr. et al. | 395/556 |
| 5,319,771 | 6/1994 | Takeda | 395/556 |
| 5,434,996 | 7/1995 | Bell | 395/550 |
| 5,491,814 | 2/1996 | Yee et al. | 395/550 |
| 5,506,982 | 4/1996 | Hotta et al. | 395/550 |
| 5,535,377 | 7/1996 | Parks | 395/556 |
| 5,537,581 | 7/1996 | Conary et al. | 395/556 |
| 5,564,042 | 10/1996 | Ventrone et al. | 395/556 |
| 5,596,765 | 1/1997 | Baum et al. | 395/800 |
| 5,619,155 | 4/1997 | Wang | 327/142 |
| 5,625,847 | 4/1997 | Ando et al. | 395/880 |
| 5,657,482 | 8/1997 | Klein | 395/558 |
| 5,666,522 | 9/1997 | Klein | 395/556 |
| 5,678,065 | 10/1997 | Lee et al. | 395/880 |
| 5,680,594 | 10/1997 | Charneski et al. | 395/556 |

*Primary Examiner*—Christopher B. Shin
*Attorney, Agent, or Firm*—Mark E. McBurney; Leslie A. Van Leeuwen

[57] ABSTRACT

An extension to an I/O bus and bridge chip is provided which allows higher speed operations. This includes control logic which switches between different data transfer speeds. A host bridge interconnects a system bus with an I/O bus. Included in the host bridge is both a high frequency and low frequency clock. The bridge chip normally operates at the lower frequency and initiates communication with the I/O at this low frequency. If the I/O device is capable of operating at a higher frequency, then a control signal is transmitted from the I/O device to the bridge chip. In response to the receipt of this signal, control logic in the bridge chip causes the higher frequency clock in the bridge chip to be activated such that the host bridge, bus and I/O device are all then operating at the higher frequency.

17 Claims, 3 Drawing Sheets

SYSTEM AND METHOD FOR HIGH FREQUENCY OPERATION OF I/O BUS

BACKGROUND OF THE INVENTION

1. Technical Field

The present invention generally relates to increasing the frequency of input/output (I/O) devices in a data processing system. More specifically, the present invention is a host bridge which provides control logic, a high frequency clock and a low frequency clock to accommodate I/O devices which run at different frequencies.

2. Description of Related Art

One of the major challenges facing today's computer designers is maintaining throughput of I/O devices relative to the processing speed of a central processing unit (CPU). That is, the frequency of microprocessors is drastically increasing to frequencies of 100 Mhz, 133 Mhz, 150 Mhz and beyond. However, many I/O devices, such as network adapter cards (e.g. token ring, LAN), fax/modem adapters, sound cards, and the like still operate at frequencies ranging from 33 Mhz to 66 Mhz. The Peripheral Component Interconnect (PCI) bus is rapidly becoming an industry standard. However, the PCI architecture specification, revision 2.1, herein incorporated by reference, only addresses frequencies up to 66 Mhz. This is true of many I/O bus architectures, not just PCI. It is a common problem for computer system developers to design I/O subsystems which cannot "feed" data to the high frequency microprocessors fast enough to keep their execution units continuously operating. That is, the high frequency processors are sometimes idle waiting for data to be input from an I/O device.

The current PCI bus specification includes a definition for 66 Mhz operation. At 66 Mhz and 64 bit (8 byte) data transfer a peak transfer rate of 528 MB/s is achieved.

There are in existence I/O devices which do in fact operate at very high frequencies, e.g. higher than 66 Mhz. However, the use of these devices is limited since the I/O bus may not be capable of operating at this high frequency. And, even if the bus was capable of operating at a high frequency, it may be forced to operate at the speed of the slowest interconnected device. In a first case, if a 66 Mhz device is connected to a 66 Mhz PCI bus, the PCI bus specification limits the operation to no more than 66 Mhz. Additionally, if a 33 Mhz device was also connected to the same I/O bus as the 66 Mhz device, the I/O bus would be forced to operate at the lowest common speed (i.e. 33 Mhz).

Therefore, it can be seen that a need exists in the industry for an I/O subsystem which can operate at a high enough frequency to keep a CPU constantly running. It would be desirable for these I/O subsystems to be capable of frequencies approaching those of current microprocessors. Further, it would be advantageous to have an I/O bus that is capable of high speed operation and that can support interconnected I/O devices having different frequencies.

SUMMARY OF THE INVENTION

In contrast to the prior art, the present invention is an extension to an I/O bus, bridge chip and I/O adapters which allows higher speed operations. Further, a system and method is provided for switching between different data transfer speeds. The present invention allows a data transfer speed of 100 Mhz, while maintaining compatibility with devices having lower (e.g. 50 Mhz or 66 Mhz) speeds. Thus, by utilizing the present invention, a peak data transfer rate of 800 MB/s may be obtained (i.e. 64 bit transfer at 100 Mhz), which is greater than a 50% increase.

Broadly, the present invention is a host bridge which interconnects a system bus with an I/O bus. Included in the host bridge is both a high frequency and low frequency clock. Additionally, control logic is provided which allows the bridge to perform bus transactions at both a high frequency and a lower frequency. The bridge chip normally operates at the lower frequency and initiates communication with the I/O at this low frequency. If the I/O device is capable of operating at a higher frequency, then a control signal is transmitted from the I/O device to the bridge chip. In response to the receipt of this signal, control logic in the bridge chip causes the higher frequency clock in the bridge chip to be activated such that the host bridge, bus and I/O device are all then operating at the higher frequency. More specifically, the I/O device will indicate its ability to operate at the higher frequency during the address phase of a read or write transaction. This indication is provided by a side band control signal sent from the I/O device to the host bridge. Subsequent to receipt of this control signal, the first and subsequent data transfer would occur at the higher transfer rate.

Typically, the higher frequency will be an integer multiple of the lower frequency. In the case of PCI, the lower frequency could be 50 Mhz and the higher frequency at 100 Mhz. This allows the data to be clocked at both the lower and higher transfer rate on the bus at the rising edge of the clock and sampled on the next rising edge of the clock signal.

In accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
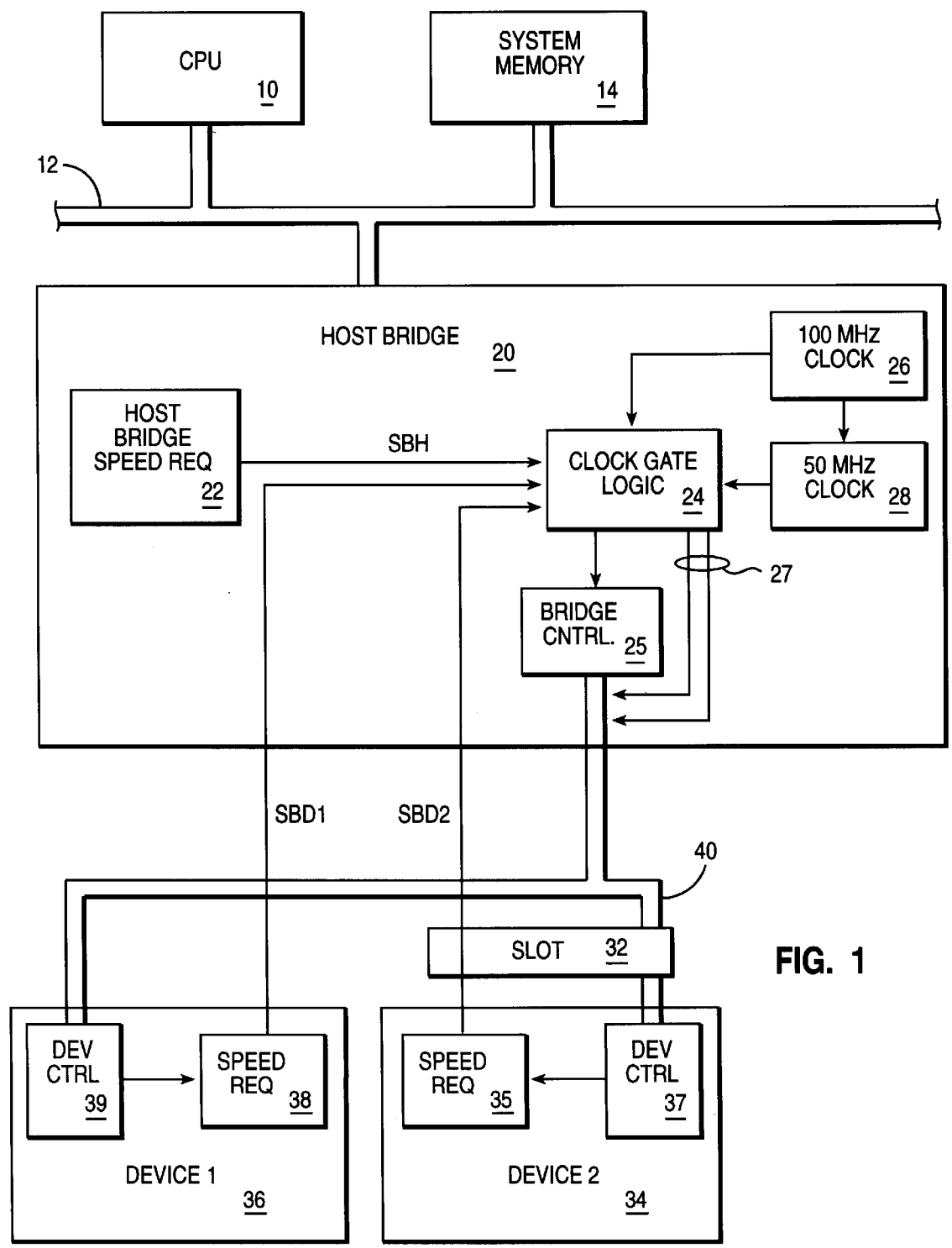
FIG. 1 is a schematic diagram showing the components of a data processing system, including the control logic and side band signals of the present invention.

Referring to FIG. 1, the relevant components of a computer capable of implementing the present invention is shown. A CPU 10, such as one of the PowerPC microprocessors (PowerPC is a trademark of IBM Corp.) available from the IBM Corporation is shown and connected to a system bus 12. Memory 14 is also connected to system bus 12 wherein CPU 10 is capable of storing data to, and loading data from memory 14. Host bridge 20 interconnects system bus 12 with I/O bus 40, such as the aforementioned PCI bus. Those skilled in the art will understand how a bridge chip 20 is needed to connect different buses, due to their differences in protocol, message passing, control signal, handshaking, and the like. Among other things, bridge 20 provides a consistent interface between buses 12 and 40, such that devices attached to each bus can communicate with one another.

Host bridge 20 includes a clock gate logic circuit 24 which controls the speed of an I/O bus 40, such as the aforementioned PCI bus which interconnects a soldered device 36 and slot 32 (with a corresponding pluggable device 34). Each of devices 34 and 36 have speed requesting circuits 38 and 35, respectively. Devices 34 and 36 also include device control logic 37 and 39, respectively. Device control logic 37, 39 determines the speed at which devices 34 and 36 can run for a particular transaction. For example, device 36 may run at 50 Mhz for an arbitration operation and address phase, but be capable of 50 Mhz or 100 Mhz operation for data transfer. Device control logic 37 will determine what type of transaction is being run and transmit a control signal to speed request circuit 35 when the higher frequency operation is desired. Similarly, host bridge 20 includes speed request circuit 22. The speed request circuits 22, 35 and 38 each output a control signal to clock gate logic circuit 24, such that the host bridge 20 can then optimize the frequency of data communications between devices 36 and 34, and bridge 20. Bridge control logic circuitry is provided in host bridge 20 which among other things, provides capability for the host bridge to perform transactions at either of two frequencies. Clock gate circuit 24 causes the frequency of bus 40 to be dynamically changed (gated) by transmitting the appropriate device unique clock lines 27. These lines are controlled in response to a determination by, e.g. device 36 and host 20, that high frequency operation is possible (i.e. 100 Mhz), by both devices. Conversely, if low frequency operation is necessary (dependent on the type of transaction, or when either the device or host is incapable of high frequency operation), these lines are controlled from clock gate logic 24 along the appropriate one of lines 27. Additionally, the control signal from bridge request circuit 22 is a side band control signal (SBH). The control signals from devices 36 and 34 are also side band signals shown as SBD1 and SBD2, respectively (for devices 1 and 2).

Specifically, FIG. 1 illustrates a block diagram of the logic which provides the capability of the present invention. A primary I/O bus 40, such as the aforementioned PCI bus, is shown which is provided by host bridge 20. Bridge 20 is capable of being operated at speeds of both 50 Mhz and 100 Mhz. It should be noted that standard operation of bus 20 could be at 66 Mhz, however, it is less complicated to step up to 100 Mhz from 50 Mhz, than it is to change the operating speed from 66 Mhz to 100 Mhz. Also, I/O devices which normally operate at 66 Mhz can be operated at 50 Mhz. Therefore, a preferred embodiment of the invention contemplates operation of I/O bus 40 at 50 and 100 Mhz. However, it should be understood, that other incremental increases in operating frequency are also contemplated by the present invention, e.g. from 66 to 100 Mhz.

It is assumed for the purposes of discussion that the I/O bus is a PCI bus, which is capable of being loaded with four (4) loads at 66 Mhz. This allows for host bridge 20, a single slot 32 (counts as 2 loads) on the planar, or system board, and a soldered device 36 on the planar, or the like. Of course, other I/O buses may have different loading characteristics and additional loads may be achievable, but must meet any timing budget required for that particular I/O bus. As noted above, clock gate logic 24 in bridge 20 receives several side band signals (SBH, SBD1, SBD2) which are used by host bridge 20 and the various I/O devices 34 and 36 to indicate the data phase speed which they can operate, e.g. 50 Mhz or 100 Mhz. If a selected target (and the requesting master) can both handle 100 Mhz data transfers, it will logically ground its side band signal (SBH for the host, SBD1 for device 36 or SBD2 for device 34) during the address phase of the data transmission. By logically grounding, it is meant that the side band control signal is driven to a logical zero (0) by the speed request logic 22, 38 and 35.

Generally, the basic I/O read or write data transfer operations would start with a normal address phase, at the lower frequency, such as 50 Mhz. If the controlling master and the selected target both signal that they can handle 100 Mhz data transfer operations, then the first and subsequent data transfers would be at the 100 Mhz data transfer rate. Data at either the lower (e.g. 50 Mhz) or higher (e.g. 100 Mhz) transfer rate would be clocked onto the bus on the rising edge of the clock signal, and sampled on the next rising edge of the clock.

Figure 2:
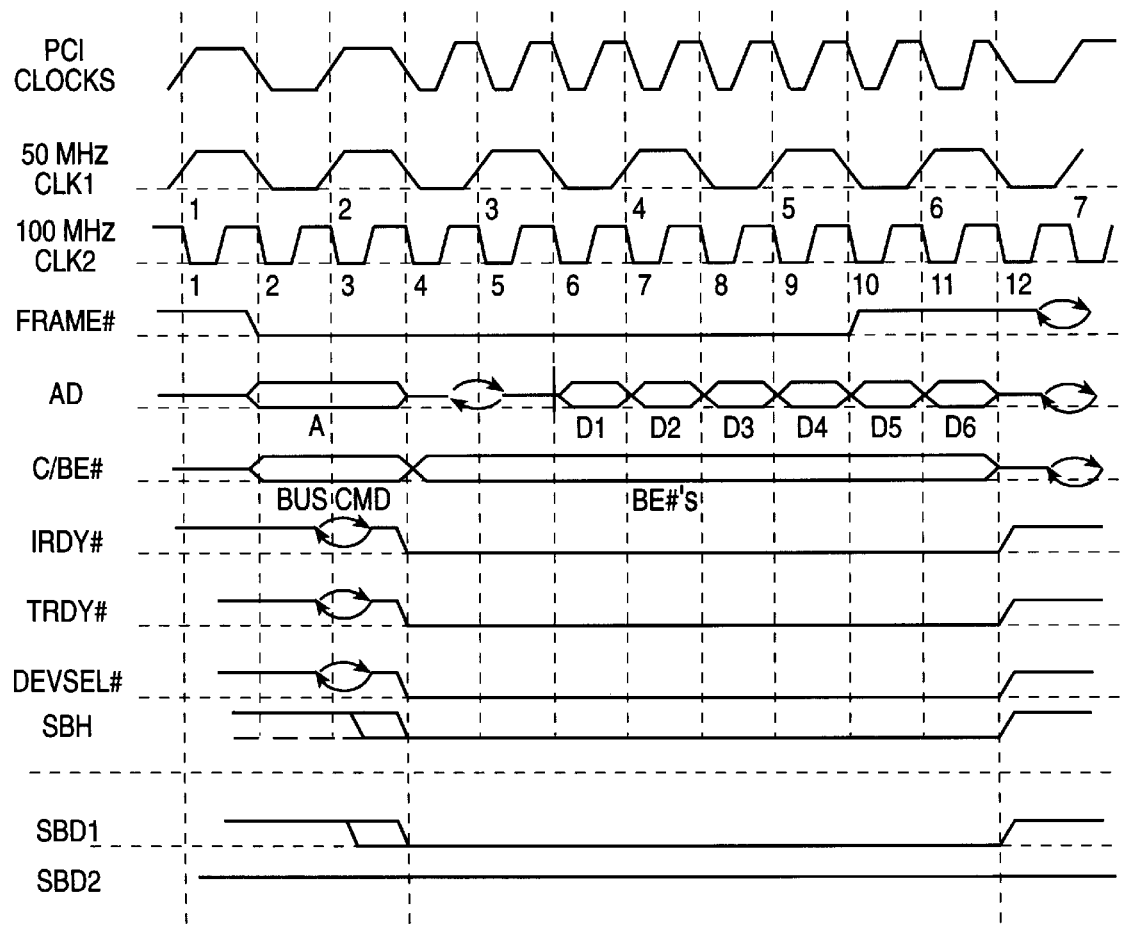
FIG. 2 is a timing diagram illustrating a basic read operation by a computer system implementing the present invention.
Figure 3:
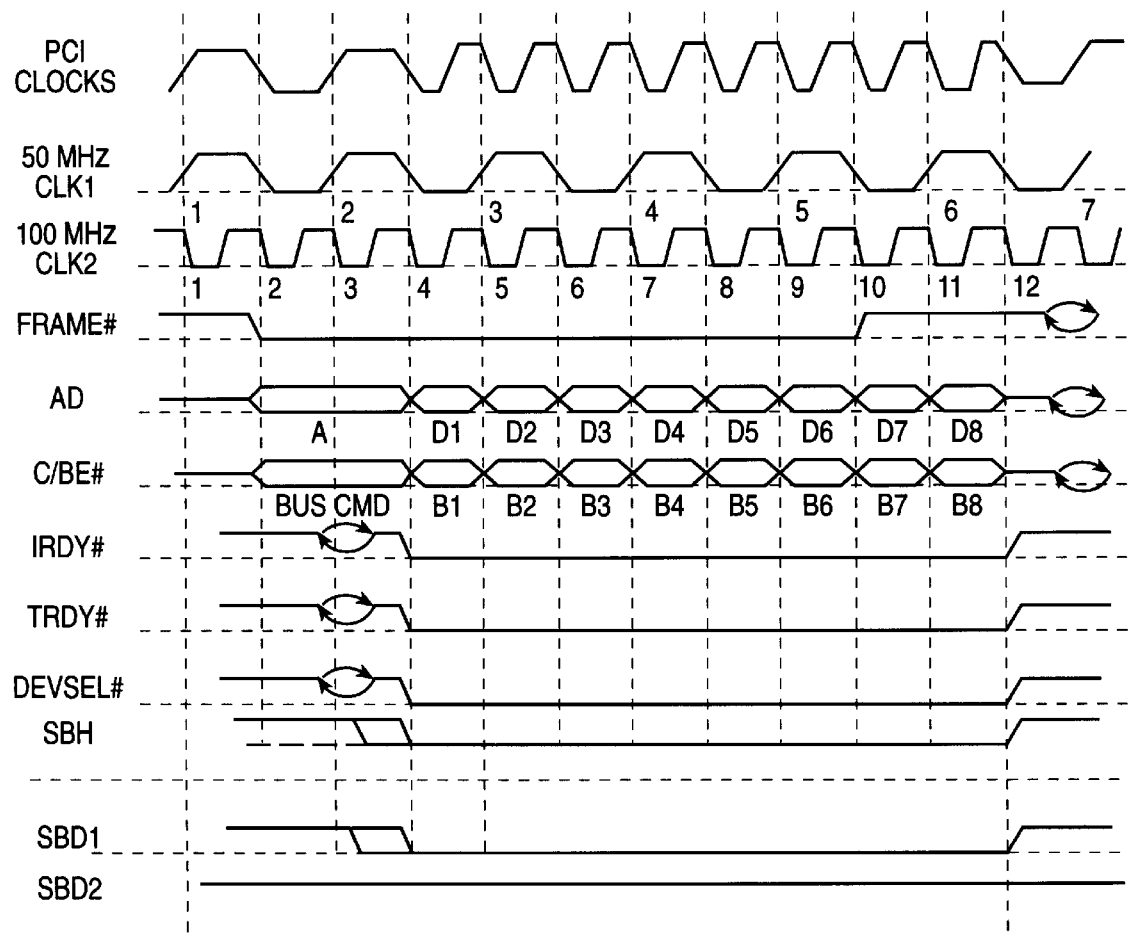
FIG. 3 is another timing diagram showing a basic write operation and the control signals associated with this operation in accordance with the present invention.

FIGS. 2 and 3 illustrate timing diagrams for both read and write operations, respectively, which show the address phase and higher frequency data transfer phase, in accordance with the present invention. In a preferred embodiment of the present invention only memory read and write operations are assumed to operate at the higher data transfer frequency. All other operations, such as I/O operations, special cycles and configuration cycles would operate at the lower data transfer rate (e.g. 50 Mhz). During the address phase, which operates at a lower frequency, i.e. 50 Mhz, the protocol for negotiating the operating frequency between the requesting bus-master and the target device occurs. In a preferred embodiment, a bus master device which owns (controls) bus 40 would only ground its SBx (e.g. SBD1 or SBD2 of FIG. 1) signal during the address phase if it is performing a memory read or memory write operation, and is capable of performing data transfer at the higher frequency (e.g. 100 Mhz). By limiting the higher data transfer rate to only memory operations, much of the existing logic circuitry in bridge 20 and devices 36 and 34, which is designed to operate at a lower frequency, can be used in order to minimize the cost and complexity of providing high frequency operation. For example, the arbitration cycles can all be run at the lower frequency to enable the existing 50 Mhz circuitry to be used without the need to design high frequency arbitration circuitry. Of course, the present invention contemplates using the high frequency mode of operation in other transactions, if the system needs require high frequency and additional cost and complexity is not a factor.

Side band signal such as SBH, SBD1 and SBD2 are provided to the clock gate logic 24 from speed requester circuits 22, 38 and 35. If any of the devices are either the controlling master or selected target in a transaction, and are capable of operating at data phases of 100 Mhz, then they will drive their respective side band signal to logical zero (ground) during the address phase of the transaction. Otherwise, clock gate logic 24 will select the lower frequency operation, e.g. 50 Mhz in this example. That is, if device 36 initiates a read operation to obtain data from system memory 14, it will first request access to bus 40 by starting an arbitration cycle. In accordance with the present invention, this arbitration will occur at the lower frequency. Once device 36 controls bus 40, it will then place address information on the bus. Those skilled in the art will understand how host bridge 20 will typically initially RETRY (signal device 36 that the targeted device is busy and to try for the access again later) device 36 on a READ access. Subsequently, bridge 20 will then go and obtain the requested data from memory 14, and store it in a buffer. Then, when device 36 again attempts to access the requested information, the bridge can transfer the data directly to device 36.

In this example, when device 36 is capable of operating at the higher frequency, such as 100 Mhz, then it will drive the signal SBD1 to logical 0, and the host bridge must also be able to operate at 100 Mhz. Thus, the SBH side band signal will also be driven to logical zero. Therefore, clock gate logic 24 will receive two active side band signals and determine that the devices activating these signal are capable of operating at the higher frequency. Clock gate logic 24 will then enable the high frequency clock 26 and drive bus 40 at 100 Mhz, for example. As noted above, the side band signals will be driven to logical 0 during the address phase, such that the actual data transfer will occur at the higher frequency. Those skilled in the art will understand how clock gate logic 24 may include various logic elements in order to implement the present invention. For example, the negative active side band signals may be inverted and input to one or more AND gate(s) such that an output signal is present when two, or more active side band signals are input.

With the PCI, and some other I/O bus specifications, each device is required to receive its own unique clock signal. With the present invention, clock gate logic 24 will select the high frequency clock for the data phase if an combination of 2 side band signals are grounded during the address phase of the transaction. Only the controlling bus master device and the selected target which both indicate they are capable of operating at 100 Mhz data phases will be clocked at 100 Mhz. The remaining devices on the bus, which are not involved in the current high frequency data transfer transaction, will continue to receive the lower frequency clock. That is, in the previous example device 34 will continue to receive the 50 Mhz signal from clock 28. This dual frequency operation does not require an additional clock signal line to be included in bus 40, since each device receives its own unique clock line which will be clocked at the appropriate frequency.

By not grounding the side band signal a controlling bus master or selected target indicates at the beginning of a transaction that it wants to be clocked at the lower frequency during this particular transaction. If a 66 Mhz device (that cannot operate at 100 Mhz) is plugged into slot 32 on bus 40, the SBD2 signal will not be grounded, rather than being grounded during the address phase (since this device will not provide an SBD2 signal). This results in the 50 Mhz clock 28 being driven to the 66 Mhz device for all transactions. This allows 66 Mhz devices to be compatible with the preferred embodiment of the present invention wherein devices operating at 50 and 100 Mhz are present. That is, the existing 66 Mhz devices are able to co-exist on bus 40 (when it operates at the higher frequency) with other devices which are capable of performing operations at the higher frequency. The side band signal of a soldered device that can operate at both 50 and 66 Mhz, but not 100 Mhz would not be connected, such that the device would always be operated at either 50 or 66 Mhz.

The controlling bus master or selected target may insert wait states at the beginning of a transaction before data transfers begin, but may not place wait states between data phases during 100 Mhz data transfers. Termination of a transaction is signalled on the next to last data transfer. In a preferred embodiment, data transfers are on either 4 or 8 byte boundaries (for either 4 or 8 byte data transfers respectively). Both the controlling bus master and selected target must be able to perform even multiples or 4 or 8 byte data transfers (for 4 byte or 8 byte transfers, respectively) to operate at 100 Mhz. This approach also allows peer to peer transactions to be operated at 100 Mhz data phase frequency. That is, if device 36 requires data from device 34, and both of these devices activate their side band signals (SBD1 and SBD2, respectively), then the data can be transferred at the higher frequency (e.g. 100 Mhz, if both devices are enabled to operate at that speed).

The timing budget (i.e. amount of time signals must be held active by a driver to ensure their receipt by the receiving device) is different for 100 Mhz data phases compared with that defined in the PCI specification, which describes 66 Mhz operation. In accordance with a preferred embodiment of the present invention, the timing budget would require 4 nanoseconds (ns) data valid time and 3 ns data propagation time. The clock skew would remain 1 ns and the data set up time would be 2 ns. Given these requirements, all of this activity would occur within the 10 ns period of a 100 Mhz clock. It can be seen that 2 ns is deleted from the data valid time, relative to the 66 Mhz specification, therefore, 2 ns less time is provided for a device to sample data. However, any potential degradation in performance can be avoided by using stronger drivers (driver circuits which switch in a smaller amount of time) in the devices to be operated at 100 Mhz. Further, a tight planar layout in routing the I/O bus to the I/O devices will also aid in achieving the 3 ns propagation time needed for 100 Mhz operation. A tight planar layout refers to placing I/O devices (if soldered) and slots closer to the bus logic, i.e. clock gate logic 24, thereby reducing propagation time and clock skew.

Referring to FIG. 2, the timing signals for a basic read operation are shown and will now be described. The 50 Mhz clock signal is shown as generated from clock 28, and the 100 Mhz clock signal is shown as generated from clock 26 (FIG. 1), and the PCI clocks as generated by the clock gate logic. A FRAME# signal is also shown which is PCI specific signal that indicates the beginning and duration of an access. An address/data control signal, AD, is shown which transmits the address of the data to be accessed and the actual data itself. A C/BE# signal transmits bus commands and byte enable signals between bridge 20 and devices 34 and 36. The IRDY# and TDRY# signals indicate that the initiating and targeted devices connected to bus 40 are ready to complete the current data phase of the transaction. A DEVSEL# control signal transmits information indicating that the receiving device has decoded its address as the target of the current access of the data transfer operation. Finally, the SBH signal represents the side band signal for host bridge 20, and SBD1 and SBD2 represent the side band signals for devices 36 and 34, respectively.

In the example used to illustrate the operation of the present invention relative to FIG. 2, it is assumed that device 36 initiates a read operation to obtain data from memory 14, via host bridge 20. At cycles 1–2 (50 Mhz clock), the address of the data to be obtained is placed on the bus, as shown by the AD signal. During cycle 2 both the SBH and SBD1 signal go active low indicating that both host bridge 20 and device 36 are enabled and capable of operating at 100 Mhz. These two signals are input to clock gate logic 24 on bridge 20 and the 100 Mhz clock 26 is gated onto bus 40. It can be seen that the address cycle and bus command cycle (during cycles 1 and 2 of the 50 Mhz clock) each are gated at 50 Mhz. However, once it is determined that both master and target can operate at the higher frequency, the data (D1–D8) is placed on the bus at a frequency of 100 Mhz. Thus, the present invention is capable of dynamically changing the frequency of an I/O bus based on the capability of the devices connected thereto.

Similarly, FIG. 3, shows a basic write operation wherein a device, e.g. 36 initiates an operation to place data in a system component, such as memory 14. At cycles 1–2 (50 Mhz clock), the address where the data is to be written is placed on the bus, as shown by the AD signal. During the address phase (cycles 1–2 50 Mhz clock), both the SBH and SBD1 signals go active low indicating that both host bridge 20 and device 36 are capable of operating at 100 Mhz. These two signals are input to clock gate logic 24 on bridge 20 and the 100 Mhz clock is gated onto bus 40. Beginning with clock 4 of the 100 Mhz clock, the address phase is followed by multiple data phases (D1–D6) writing the data to host bridge 20 from device 36. It should be noted that if device 36 was writing to device 34, and the side band signals SBD1 and SBD2 were active, then the data transfer could occur at 100 Mhz. However, if device 34 were a 50 Mhz device, then SBD2 would not be active and the data transfer would proceed at 50 Mhz.

Although certain preferred embodiments have been shown and described, it should be understood that many changes and modification may be made therein without departing from the scope of the appended claims.

We claim:

1. A data processing system including a bridge for interconnecting a plurality of devices on a bus, comprising:

means for outputting, from a first device, a first signal indicating a first device frequency;

means for outputting, from a second device, a second signal indicating a second device frequency; and means in the bridge for dynamically selecting, as a transaction occurs between the first device and the second device, a transaction frequency, based upon the first signal and the second signal, wherein the transaction will occur on the bus at the selected transaction frequency.

2. A data processing system according to claim 1, wherein the first device is the bridge, the first signal is a host signal indicating a host frequency for the transaction, and said means for dynamically selecting a transaction frequency is based upon the host signal and the second signal.

3. A data processing system according to claim 1, further comprising means in the bridge for generating a plurality of clock signals, wherein at least one of the clock signals is of a different frequency than another one of the clock signals.

4. A data processing system according to claim 3, wherein said means for dynamically selecting a transaction frequency comprises a control circuit for dynamically selecting one of the plurality of clock signals.

5. A data processing system according to claim 1, wherein said means for dynamically selecting a transaction frequency further comprises means for gating a frequency of the bus to a frequency higher than a normal operating frequency when the first device and the second device are enabled to operate at the higher frequency.

6. A data processing system according to claim 5, wherein said means for gating a frequency of the bus to a frequency higher than a normal operating frequency further comprises means for allowing a third device to monitor the bus at the normal operating frequency.

7. A data processing system according to claim 6, wherein said means for allowing a third device to monitor the bus at the normal operating frequency further comprises:

means for conducting a protocol phase of the transaction at the normal operating frequency; and means for conducting one or more data phases of the transaction at the higher frequency.

8. A data processing system according to claim 7, further comprising means for signaling termination of the transaction on a next to last data transfer if the transaction is occurring at the higher frequency, and means for signaling termination of the transaction on a last data transfer if the transaction is occurring at the normal operating frequency.

9. A data processing system according to claim 7, wherein wait states are not allowed between data phases if the transaction is occurring at the higher frequency.

10. A method of interconnecting, in a data processing system, a bridge and a plurality of devices on a bus, comprising the steps of:

outputting, from a first device, a first signal indicating a first device frequency;

outputting, from a second device, a second signal indicating a second device frequency; and dynamically selecting by the bridge, as a transaction occurs between the first device and the second device, a transaction frequency, based upon the first signal and the second signal, wherein the transaction will occur on the bus at the selected transaction frequency.

11. A method according to claim 10, wherein the first device is the bridge, the first signal is a host signal indicating a host frequency for the transaction, and said step of dynamically selecting a transaction frequency is based upon the host signal and the second signal.

12. A method to claim 10, further comprising the step of generating a plurality of clock signals in the bridge, wherein at least one of the clock signals is of a different frequency than another one of the clock signals.

13. A method according to claim 10, wherein said step of dynamically selecting a transaction frequency further comprises the step of gating a frequency of the bus to a frequency higher than a normal operating frequency when the first device and the second device are enabled to operate at the higher frequency.

14. A method according to claim 13, wherein said step of gating a frequency of the bus to a frequency higher than a normal operating frequency further comprises the step of allowing a third device to monitor the bus at the normal operating frequency.

15. A method according to claim 14, wherein said step of allowing a third device to monitor the bus at the normal operating frequency further comprises the steps of:

conducting a protocol phase of the transaction at the normal operating frequency; and conducting one or more data phases of the transaction at the higher frequency.

16. A method according to claim 15, further comprising the step of signaling termination of the transaction on a next to last data transfer if the transaction is occurring at the higher frequency, and the step of signaling termination of the transaction on a last data transfer if the transaction is occurring at the normal operating frequency.

17. A method according to claim 15, wherein wait states are not allowed between data phases if the transaction is occurring at the higher frequency.

* * * * *